Patented Apr. 13, 1943

2,316,625

UNITED STATES PATENT OFFICE 2,316,625

TERPENE HALO-ALKYL-ETHER-AMINE CONDENSATION PRODUCT

Lyle W. Rothenberger, Brunswick, Ga., assignor to Hercules Powder Company, Wilmington, Del., a corporation of Delaware No Drawing. Application August 21, 1940, Serial No. 353,529

20 Claims. (Cl. 260—570.5)

This invention relates to a terpene ether-amine condensation product and, more particularly, to a condensation product prepared by condensing an ether of a terpene radical and a halogen substituted organic radical with an amine.

It is an object of the present invention to effect the condensation of an ether of a terpene radical and a halogen substituted organic radical with an amine.

Another object is to effect the condensation of a terpinyl ether of a halogen substituted aliphatic radical with an amine.

Another object is to effect the condensation of a terpinyl haloalkyl ether with a primary secondary, or tertiary alkyl, aryl or aralkyl amine.

Another object is to effect the condensation of a terpinyl haloalkyl ether with an alkylol amine.

Another object is to effect the condensation of a terpene haloalkyl ether with a tertiary amine.

Another object is to make available the hydrohalide addition products of the foregoing condensation products.

Another object is to make available the alkyl halide addition products of the foregoing condensation products.

Still another object is to devise a process for the production of the foregoing compounds.

In accordance with the present invention, condensation is effected between a terpene halo-substituted ether and an amine. A typical method of procedure comprises heating to an elevated temperature a mixture of an ether of a terpene radical and a halogen substituted organic radical with an amine.

The reaction is usually carried out in the presence of a catalyst which may conveniently be an amine hydrohalide addition product in an amount ranging from about 0.2 to about 0.5 mol per mol of ether taken. Examples of catalysts other than amine hydrohalide addition products which may be used are hydroiodic acid, hydrobromic acid, hydrochloric acid, sulfuric acid, acetic acid, p-toluene sulfonic acid, ferrous iodide, etc. Following the reaction, the mixture is allowed to cool and is then treated with an alkali so as to decompose hydrohalide-amine catalyst and hydrohalide-condensate addition products, and treated to recover the condensation product, the product thus obtained comprising the condensate.

Preferably, the reactants are employed in such proportion that from about 1 to about 4 mols of the amine are present for each mol of the ether to be condensed. Where the amine is a polyamine or where a polyhalogen substituted terpene ether containing a plurality of halogen groups on a single organic radical or a plurality of halogen substituted etherified organic groups is used, the molar proportions are adjusted accordingly so that there is presented by the amine from about 1 to about 4 amine groups per halogen group in an etherified organic radical of said ether.

Usually the mixture is agitated during the reaction either by the provision of a suitable agitator or as a result of the heating or refluxing of the mixture. If desired, the reaction may be carried out under elevated pressure in a suitable autoclave.

The use of equimolar proportions of the ether and the amine will yield the desired condensation product with somewhat less side reactions. However, the use of an excess of the amine is frequently desirable in order to effect better yields on the basis of the ether taken.

Although use of a catalyst increases somewhat the amount of by-products produced, such use of a catalyst is generally desirable because of the more rapid condensation effected therewith.

Where an amine hydrohalide catalyst is employed, it is preferably used in the form of the hydrohalide addition product of the amine being condensed with the terpene halo-substituted ether, and may be present either in the form of separately prepared hydrohalide addition product or as a result of the incorporation in the reactive mixture of a hydrohalide such as hydrochloric, hydrobromic, or hydroiodic acid which reacts with the amine.

The reaction temperature may vary between about 100° C. and about 250° C., but a preferred temperature is within the range of from about 170° C. to about 210° C. The reaction period may range from about 1 to about 24 hours, but a preferable time range is between about 4 and about 10 hours.

As the ether employed in carrying out the condensation of the present invention, I may use terpinyl betachloroethyl ether prepared in the manner described in the copending application of D. H. Sheffield, Serial No. 301,761, filed October 28, 1939. A method described in that application for the production of this ether is as follows:

Four hundred g. of alpha pinene were added to 600 g. of ethylene chlorohydrin and 12 g. of 75% by weight sulfuric acid and the mixture well agitated. The reaction which took place evolved heat, the temperature being maintained at 45° C. by cooling. After 3 hours, the reaction was complete. Acid and excess ethylene chlorohydrin were then removed by two washes of about 500 g. each of 10% by weight aqueous sodium carbonate solution. The resulting oil was then fractionated into two components by distillation. The fraction coming over between 115 and 130° C. at 8 millimeters absolute pressure consisted essentially of terpinyl beta-chloroethyl ether. This compound may be characterized by the following formula:

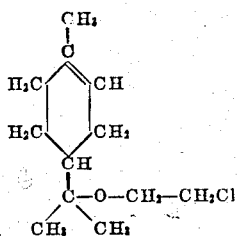

Where terpinyl beta-chloroethyl ether having this structural formula is condensed with aniline in accordance with the present invention, the principal condensation product may be designated as terpinyl beta-monoethyl aniline ether (i. e. the mono-anilide of the ethyl ether of alpha terpineol) and may be characterized by the following formula:

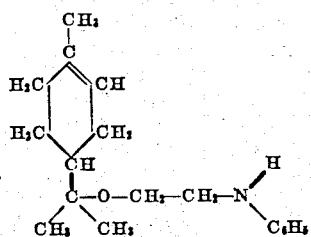

Other terpene ethers which are suitable are, for example, terpinyl chloropropyl ether, terpinyl chlorobutyl ether, terpinyl chloroamyl ether, terpinyl chloro-octyl ether, terpinyl chlorophenyl ether, the terpinyl ether of glycerin monochlorohydrin, terpinyl chloro-octadecamethylene ether, etc., the corresponding fenchyl, bornyl, isobornyl, etc. ethers, and the corresponding bromo and iodo substituted ethers. The terpene radical may be either a hydrocarbon radical or an oxygenated hydrocarbon radical such as a terpene radical, containing one or more hydroxy groups, keto groups, carboxyl groups, etc. The organic group may contain one or more halogen groups. Thus, terpinyl dichloropropyl ether, prepared by reacting alpha pinene with glycerin dichlorohydrin may be employed.

The condensation proceeds most readily when using an iodine substituted ether, less readily when using a bromine substituted ether and still less readily when using a chlorine substituted ether. The halogen atom on the alkyl group may be attached to a primary, secondary, or tertiary carbon atom, and the point of etherification of the alkyl group may likewise be at a primary, secondary or tertiary position.

As examples of suitable amines for use in reaction, the following may be named: primary aromatic amines, such as aniline, toluidine, alpha naphthylamine, beta naphthylamine, etc.; secondary aromatic amines, such as methyl aniline, diphenyl amine, etc.; tertiary aromatic amines, such as methyl ethyl aniline, dimethyl aniline, triphenyl amine, etc.; aralkyl amines, such as benzyl amine; aliphatic amines, such as methyl, ethyl, propyl, butyl, and octyl amine, dimethyl, diethyl, dipropyl, dibutyl, and dioctyl amine, trimethyl amine, triethyl amine, etc.; diamines such as ethylene diamine, phenylene diamine, etc.; mixed aliphatic amines, such as methyl ethyl amine, ethyl butyl amine, ethyl butyl octyl amine, etc. The amine employed may, if desired, be an alkylolamine, such as monoethanolamine, diethanolamine, or a tertiary alkylolamine such as triethanolamine. Where a polyamine is employed, one mol thereof is equivalent to a number of mols of a monoamine equal to the number of amino groups present in the polyamine. Thus where a diamine is employed, only one-half of the usual molar quantity need be used.

Where a tertiary amine is employed as the reactant, the condensation product comprises a quaternary ammonium compound; for example, when terpinyl beta-chloroethyl ether is reacted with trimethyl amine, the condensate appears to have the following configuration:

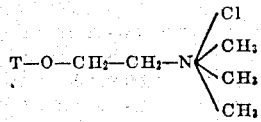

where T is the terpinyl radical (having the empirical formula $C_{10}H_{17}$, the structural formula depending upon whether derived from alpha, beta or gamma terpinene, alpha or beta phellandrene, terpinolene, pseudo limonene, dipentene, or other p-methadiene, and upon which of the two double bonds of the methadiene has been eliminated during the formation of the ether). The speed of reaction and the yield of the quaternary ammonium compounds depend upon the chemical configuration of the reactants, upon the solvent employed for the reactants, upon the particular halogen with which the terpene ether is substituted and upon numerous other factors. The quaternary ammonium compound resulting from the reaction of terpinyl beta-chloroethyl ether with methyl ethyl aniline is especially useful.

The quaternary ammonium compounds may also be prepared by reacting the condensate of a terpene halo-ethyl ether and a secondary amine with an alkyl halide. One example of such a compound is that resulting from the reaction of methyl chloride with the condensate from terpinyl beta-chloroethyl ether and dimethyl aniline.

If desired, the secondary or tertiary condensation products of the present invention, after washing with aqueous sodium hydroxide or the like and then with water followed by drying, may be reacted with additional terpinyl beta-chloroethyl ether or its equivalent to give either a tertiary or a quaternary condensation product. Thus, further condensation may be carried out in the same manner as that described above.

Where quaternary salts are formed, they may, if water soluble, be removed by extraction of the reaction mixture with water. The aqueous solution containing the quaternary salt may then be concentrated by evaporation. The quaternary salt when water soluble may be stored or sold in concentrated aqueous solution.

The condensation products prepared in accordance with the present invention may be characterized by the general formula:

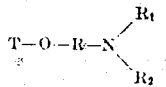

where T is a terpene radical such as terpinyl, where R is an alkylene group, and where $R_1$ and $R_2$ are either hydrogen or an organic radical such as an aliphatic group, an aromatic group, an aralkyl group, an alkaryl group, or a hydroxyl substituted group of this type, etc. Preferably, at least one of $R_1$ and $R_2$ is a hydrocarbon or a hydroxyl substituted hydrocarbon nucleus of the type just described. The nitrogen atom is trivalent in the case of the condensates from primary and secondary amines and is pentavalent in the case of the condensates from the tertiary amines or of the hydrohalide salts of the condensates from primary or secondary amines.

The hydrohalide addition products formed by the addition of a hydrohalide such as hydrochloric acid to the condensate from a primary and secondary amine, are formed during the reaction as an intermediate, from which the condensate with trivalent nitrogen may be obtained by the neutralization with a base and may be characterized by the general formula:

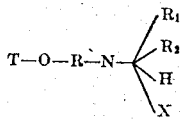

where T, R, and $R_1$ and $R_2$ have the same significance as above, where H is hydrogen, and where X is a halogen derived from the terpene halo-alkyl ether or from the hydrohalide used in forming the addition product.

The quaternary ammonium compounds may be characterized by the general formula:

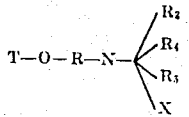

where T is a terpene radical as before, R is an alkylene group, $R_3$, $R_4$, and $R_5$ are hydrocarbon radicals of hydroxyl substituted hydrocarbon radicals and where X is a negative group, such as a halogen group, a hydroxyl group or the like.

The quaternary ammonium hydroxides (where X in the foregoing formula is a hydroxyl group) may be prepared in any suitable manner for example, by treating the quaternary ammonium halides with an ethyl alcohol solution of sodium or potassium hydroxide which causes precipitation of sodium or potassium halide or with an aqueous suspension of silver oxide which causes precipitation of insoluble silver halide.

While it is believed that the condensation involves principally the reaction of the halo-alkyl terpene ether with the amine at the halogen center, where the terpene halo-alkyl ether contains unsaturated double bonds, under some circumstances reaction with the amine takes place additionally at such double bonds. The amount of condensation of the amine at unsaturated centers of the terpene ether may be greatly reduced by the use of molar proportions of the reactants, or by carrying out the reaction in the absence of a catalyst. The product of such condensation may be characterized by the general formula:

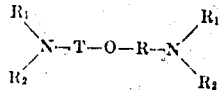

where T, R, $R_1$, and $R_2$ have the same significance as above. For example, where terpinyl beta-chloroethyl ether is reacted with aniline under conditions which give rise to such condensation, the product is believed to be characterized by the following formula:

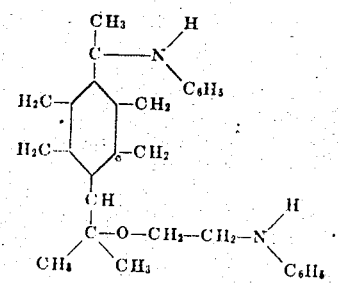

The process and the product of such condensation are deemed to be within the scope of the present invention, which, however, is not to be construed as limited to any theory with regard to the reaction between the terpene halo-alkyl ether and the amine.

The reaction may be facilitated by the presence of a solvent for the reactants and the condensation product. Preferably, the solvent is inert and takes no part in the reaction. Examples of suitable solvents are ethyl alcohol, methyl alcohol, ethylene glycol, glycerine, benzene, toluene, hexane, gasoline, etc.

Following the condensation, in the case of the reaction of the terpene halo-alkyl ether with a primary or secondary amine, the condensation product which is present in the form of the hydrohalide addition product may be neutralized with alkali. The alkali is usually employed in the form of an aqueous solution of concentration varying from about 5 to about 50% by weight. Suitable alkalies are sodium and potassium hydroxides, sodium and potassium carbonates, calcium hydroxide, ammonium hydroxide, etc. At least one mol of alkali must be used per mol of terpene halo-alkyl ether employed in order to give complete neutralization. Following treatment with alkali, the product may be washed with water, dried, and purified in any suitable manner as by distillation to remove unreacted amine therefrom and to recover a pure product.

If desired, the reaction may be carried out in stages, by neutralizing the reaction product after each stage with an alkali to convert the hydrohalide addition product of the condensation product to the condensate itself, washing with water, drying, adding terpene halo-alkyl ether and additional catalyst to the condensate, and reacting to yield the condensate of the next degree of condensation. For example, this may be carried out by reacting one mol of terpinyl beta-chloroethyl ether with one mol of aniline in the presence of 0.3 mol of aniline hydrochloride, treating the reaction mixture with 1.3 mols of sodium hydroxide in the form of an aqueous solution, separating the aqueous layer, washing the oily condensate, distilling the resulting condensate to remove aniline therefrom, adding one mol of terpinyl beta-chloroethyl ether and some additional catalyst, and reacting the mixture by heating to yield a tertiary condensation product. If desired, this procedure may be repeated on the tertiary product to obtain the quaternary condensation product.

It is preferable to carry out the condensation in the absence of water since the presence of water in substantial amounts in the reaction mixture reduces materially the yield of product and the speed of reaction. If desired, one may carry out the reaction under pressure which may vary from atmospheric up to 100 atmospheres so as to promote a rapid reaction.

Below are given several specific examples showing methods of condensing a terpene halo-alkyl ether with an amine.

Example 1

One hundred and sixty-eight grams of aniline were treated with dry hydrogen chloride until the weight increased 7.2 g. The mixture comprised 1.6 mols of aniline and 0.2 mol of aniline hydrochloride. There was added to the mixture 100 g. of terpinyl beta-chloroethyl ether (0.46 mol) and the mixture was refluxed for 8 hours by heating in an oil bath at 200–210° C. The mixture was allowed to cool and was then agitated with 175 c. c. of 25% sodium hydroxide solution. The oily layer was separated, washed with 5% sodium chloride solution and dried over solid sodium hydroxide. The mixture was fractionally distilled at reduced pressure of from 5 to 1.5 millimeters absolute. The fraction coming over at 5 mm. and between 45 and 100° C. was unreacted aniline. The fraction coming over at between 130 and 192° C. at a pressure of 3–1.5 mm. comprised the condensate in accordance with the present invention.

Example 2

Eight hundred forty grams of aniline were treated with dry hydrogen chloride until the weight increased 36 g. whereupon some crystalline aniline hydrochloride separated out. The mixture comprised 8 mols of aniline and 1 mol of aniline hydrochloride. There was added to the mixture 500 g. (2.31 mols) of terpinyl beta-chloroethyl ether, and the mixture was refluxed for 8 hours in an oil bath at 190–195° C. The mixture was then washed with 875 c. c. of 25% aqueous sodium hydroxide solution and then with water. During the washing with water, the addition of salt was found necessary in order to prevent or break any emulsions. The aniline was recovered by vacuum distillation. Further distillation gave the following fractions which were viscous oils comprising the product of the present invention:

| Fraction | Vapor temp., °C. | Pressure, mm. | Yield, g. | Color |
|---|---|---|---|---|
| 1 | 132–142 | 1.8 | 157 | Light amber. |
| 2 | 130–142 | 1.1–1.4 | 109 | Do. |
| 3 | 133–183 | 0.8–1.0 | 185 | Do. |
| 4 | 173–250 | 1.1 | 259 | Dark brown. |

Analysis indicated that fractions 1 to 3 comprise a product wherein condensation has taken place only at the halogen center, and that fraction 4 is a product wherein condensation has taken place both at the halogen center and at the terpinyl double bond.

Example 3

A mixture of 108 g. (0.5 mol) of terpinyl beta-chloroethyl ether, 186 g. aniline (2 mols) and 12.9 g. aniline hydrochloride (0.1 mol) was refluxed for 8 hours at 190–195° C. The reaction mixture was neutralized by treatment with 150 g. of 25% aqueous sodium hydroxide solution and the oil layer dried over solid sodium hydroxide.

Excess aniline was removed by distilling the oily layer at 7 mm. pressure, the aniline passing over at 60° C. When the vapor temperature started rising rapidly to 100° C., distillation was stopped. The residue which constituted the condensate consisted of 130 g. of a dark colored viscous liquid. The material appeared to contain some product which forms by condensation of aniline at the double bond of the terpinyl beta-chloroethyl ether.

Example 4

A mixture of 50 g. terpinyl beta-chloroethyl ether (0.23 mol) and 15 g. monoethanolamine (0.24 mol) was refluxed for 5 hours at 190–200° C. After washing with 2% sodium hydroxide, extraction with ether and evaporation of the solvent, there was obtained a dark green liquid comprising the condensate of the present invention.

Example 5

A mixture of 72 g. terpinyl beta-chloroethyl ether (0.33 mol) and 50 g. of triethanolamine (0.35 mol) was heated at 180–200° C. for 4 hours. The reaction mixture consisted of dark green liquid and a quantity of white water insoluble solid which was filtered off. The liquid was washed with water and dried. This liquid contained quaternary amine condensate.

Example 6

A mixture of 50 g. of terpinyl beta-chloroethyl ether (0.23 mol), 150 c. c. of a 30% aqueous solution of trimethyl amine (0.76 mol) and about 0.1 g. of ferrous iodide as catalyst was heated at 200° C. for 9 hours in a steel bomb. The reaction product consisted of 2 layers. The upper oily layer was washed with 12% sodium hydroxide and dried. This product contained some quaternary condensation product. The aqueous wash liquid contained additional quaternary compounds.

Example 7

A mixture of 50 g. of terpinyl chloroethyl ether (0.23 mol), 12 g. of ethylene diamine (0.21 mol) and 0.1 g. ferrous iodide was heated at 160–165° C. for 8 hours. The reaction product was a viscous red liquid containing considerable solid. The mixture was extracted with 200 c. c. of ether and the insoluble solid filtered off. The ether solution was washed with 150 c. c. of 12% sodium hydroxide and the solvent evaporated, yielding the condensate.

The reaction products made in accordance with the present invention are useful in a number of arts. The products made by condensation of the terpene halo-alkyl ether with a primary or a secondary amine are exceedingly useful as anti-oxidants for wood rosin. Thus, wood rosin containing 1% of the condensation product of terpinyl beta-chloroethyl ether with aniline made in accordance with Examples 1 to 3 shows a marked reduction in weight increase upon exposure to oxygen under pressure, this increase in weight being less than 1/50 that for pure wood rosin and less ½ that of wood rosin containing 1% phenyl beta-naphthylamine. The condensation products made from the primary and secondary amines are also very useful as anti-oxidants for rubber. Thus, a rubber stock of the following formula was prepared:

| | Grams |
|---|---|
| Rubber | 500 |
| Reogen (a mixture of 80 parts by weight of selected mineral oil, 15 parts of a sulfonated petroleum product known as Sulfo A, and 5 parts of normal butyl alcohol | 5 |
| Zinc oxide | 25 |
| Stearic acid | 5 |
| Captax (mercaptobenzothiazole) Terpinyl beta-chloroethyl etheraniline condensate made in accordance with Example 1 and distilling over at 150–160° C. at 1.5 mm. pressure | 5 |
| Sulfur | 15 |

These ingredients were milled together and test pieces made therefrom were aged 7 days at 80° C. in circulating air. These test pieces retained 74% of their initial tensile strength while a comparison specimen containing no anti-oxidant and aged under the same conditions retained only 63% of its tensile strength.

The compounds of the present invention are also useful as plasticizers for resins, plastics, cellulose derivatives, etc., as anti-oxidants for dry paper sizes made from rosin, as flotation agents for non-metallic minerals, and as stabilizers for nitroglycerine explosives. The quaternary ammonium compounds made in accordance with the present invention are valuable in textile treating.

In this specification and in the claims appended thereto, the term "hydrohalide" is intended to denote hydrogen chloride, hydrogen bromide and hydrogen iodide, and the term "halogen" to designate chlorine, bromine and iodine.

It is to be understood that the details and examples hereinbefore set forth are illustrative only and that the invention as broadly described and claimed is in no way limited thereby.

What I claim and desire to protect by Letters Patent is:

1. The process which comprises heating for a period ranging from about 4 to about 10 hours at a temperature of from about 170° C. to about 210° C. a mixture of terpinyl beta-chloroethyl ether and aniline in the ratio of from about 1 to about 4 mols of aniline per mol of said ether in the presence of from about 0.2 to about 0.5 mol of aniline hydrochloride per mol of said ether, cooling, commingling the mixture with an aqueous alkali solution, and recovering an oily condensate of said ether and aniline from the mixture.

2. A condensation product of an amine with a terpene halo-alkyl ether, said ether being one in which a terpene carbon atom of the terpene radical is directly bonded to the ether oxygen atom and in which the halo-alkyl radical contains at least two carbon atoms and bears a halogen substituent on a carbon atom at least one carbon atom removed from the ether oxygen atom.

3. A condensation product of a primary amine with a terpene halo-alkyl ether, said ether being one in which a terpene carbon atom of the terpene radical is directly bonded to the ether oxygen atom and in which the halo-alkyl radical contains at least two carbon atoms and bears a halogen substituent on a carbon atom at least one carbon atom removed from the ether oxygen atom.

4. A condensation product of a secondary amine with a terpene halo-alkyl ether, said ether being one in which a terpene carbon atom of the terpene radical is directly bonded to the ether oxygen atom and in which the halo-alkyl radical contains at least two carbon atoms and bears a halogen substituent on a carbon atom at least one carbon atom removed from the ether oxygen atom.

5. A condensation product of a tertiary amine with a terpene halo-alkyl ether, said ether being one in which a terpene carbon atom of the terpene radical is directly bonded to the ether oxygen atom and in which the halo-alkyl radical contains at least two carbon atoms and bears a halogen substituent on a carbon atom at least one carbon atom removed from the ether oxygen atom.

6. A condensation product of a primary aromatic amine with a terpene halo-alkyl ether, said ether being one in which a terpene carbon atom of the terpene radical is directly bonded to the ether oxygen atom and in which the halo-alkyl radical contains at least two carbon atoms and bears a halogen substituent on a carbon atom at least one carbon atom removed from the ether oxygen atom.

7. A condensation product of aniline with a terpene halo-alkyl ether, said ether being one in which a terpene carbon atom of the terpene radical is directly bonded to the ether oxygen atom and in which the halo-alkyl radical contains at least two carbon atoms and bears a halogen substituent on a carbon atom at least one carbon atom removed from the ether oxygen atom.

8. A condensation product of an amine with a terpene chloroalkyl ether, said ether being one in which a terpene carbon atom of the terpene radical is directly bonded to the ether oxygen atom and in which the chloroalkyl radical contains at least two carbon atoms and bears a chlorine substituent on a carbon atom at least one carbon atom removed from the ether oxygen atom.

9. A condensation product of an amine with a terpene beta-chloroethyl ether, said ether being one in which a terpene carbon atom of the terpene radical is directly bonded to the ether oxygen atom.

10. A condensation product of an amine with terpinyl beta-chloroethyl ether.

11. A condensation product of a primary amine with terpinyl beta-chloroethyl ether.

12. A condensation product of a secondary amine with terpinyl beta-chloroethyl ether.

13. A condensation product of a tertiary amine with terpinyl beta-chloroethyl ether.

14. A condensation product of a primary aromatic amine with terpinyl beta-chloroethyl ether.

15. A condensation product of aniline with terpinyl beta-chloroethyl ether.

16. A condensation product of an alkylolamine with terpinyl beta-chloroethyl ether.

17. A condensation product of a tertiary aliphatic amine with terpinyl beta-chloroethyl ether.

18. A condensation product of an alkylenediamine with terpinyl beta-chloroethyl ether.

19. The process which comprises condensing an amine with a terpene halo-alkyl ether, said ether being one in which a terpene carbon atom of the terpene radical is directly bonded to the ether oxygen atom and in which the halo-alkyl radical contains at least two carbon atoms and bears a halogen substituent on a carbon atom at least one carbon atom removed from the ether oxygen atom.

20. The process which comprises condensing an amine with a terpene beta-chloroethyl ether, said ether being one in which a terpene carbon atom of the terpene radical is directly bonded to the ether oxygen atom.

LYLE W. ROTHENBERGER.